United States Patent

[11] 3,611,031

| | | | |
|---|---|---|---|
| [72] | Inventor | Michael A. Lutz | |
| | | Los Angeles, Calif. | |
| [21] | Appl. No. | 45,460 | |
| [22] | Filed | June 11, 1970 | |
| [45] | Patented | Oct. 5, 1971 | |
| [73] | Assignee | Hughes Aircraft Company | |
| | | Culver City, Calif. | |

[54] SERIES SEQUENTIAL CIRCUIT BREAKER
10 Claims, 4 Drawing Figs.

[52] U.S. Cl. .................................................. 317/11 C,
    200/144 AP, 307/136
[51] Int. Cl. .................................................. H02h 7/22
[50] Field of Search .......................................... 317/11 A,
    11 C, 11 E; 307/133, 136; 200/144 AP

[56] References Cited
UNITED STATES PATENTS
3,249,810  5/1966  Strom et al. .................. 317/11 A 3,475,620  10/1969  Murray et al. ................. 307/136
3,522,472  8/1970  Breitholtz ..................... 317/11 C X
3,534,226  10/1970  Lian .......................... 317/11 C Primary Examiner—James D. Trammell
Attorneys—James K. Haskell and Allen A. Dicke, Jr.

ABSTRACT: The circuit breaker for high-voltage, high-current DC circuits comprises at least two serially connected transfer switches, an electronic switch connected in parallel across each of said transfer switches, an energy absorbing resistor connected in parallel across each electronic switch except the last electronic switch so that successive opening of the first transfer switch and first electronic switch, followed by successive opening of the remaining transfer switches and electronic switches, causes current reduction and subsequent interruption.

INVENTOR.
MICHAEL A. LUTZ,
BY
Allen A. Dicke, Jr.,
AGENT.

SERIES SEQUENTIAL CIRCUIT BREAKER

BACKGROUND OF THE INVENTION

This invention is directed to a series-sequential circuit breaker of such nature as to permit the controlled interruption of current flow in high-current, high-voltage DC power lines.

The multiphase transmission of electric power at a frequency corresponding to the generating source and the load equipment is widely used at present. The employment of alternating current is desirable because it permits the use of transformers to change voltages from a value suitable for generation, to a value suitable for transmission, to a value suitable for distribution, and finally to a value suitable for use.

Increasing power demand by the technologically advancing community has resulted in transmission at higher voltages and for longer distances. The transmission line reactance is such that further increase of transmission line length or voltage becomes uneconomic. The user must pay for even greater power losses as distances and voltages are increased.

As a result of this, efforts have been made to transmit electric power by direct current links. Direct current is much more satisfactory from a reactance viewpoint for subsea or subterranean installations. Thus, modern interisland ties have been DC in nature. The same considerations also apply to long overground installations. With increasing size of urban centers, and with the aesthetic demands that lines be placed underground wherever possible, it is expected that future urban transmission lines will to a great extent be subterranean. This requirement points to the need for employing direct current transmission.

Of course, the resistance loss of a DC line is decreased by increasing the voltage and decreasing the line current. However, switching and interrupting devices for such higher voltage, and especially high-current DC transmission lines have previously been unavailable.

SUMMARY

In order to aid in the understanding of this invention, it can be stated in essentially summary form that it is directed to a series-sequential circuit breaker wherein at least two transfer switches are serially connected in a high-voltage, high-current DC line, with an electronic switch connected in parallel across each of said transfer switches and an energy-absorbing resistor connected in parallel with each of said electronic switches except the last one. By sequentially opening the first transfer switch and first electronic switch followed by successive opening of the remaining transfer switches and electronic switches, DC circuit current is reduced and interrupted.

Accordingly, it is an object of this invention to provide a series-sequential circuit breaker which is capable of breaking a high-voltage, high-current DC circuit. It is a further object to provide a circuit breaker which will permit the employment of DC transmission lines with circuit breakers therein to control circuit faults.

It is another object to provide a circuit breaker having a plurality of serially connected switches in the DC line with an electronic switch in parallel to each of them, so that as each switch in the line is opened, the current is transferred to its parallel electronic switch, which minimizes arcing of the in-line transfer switches. It is a further object of this invention to provide resistances in parallel across all but the last of the electronic switches so that when the electronic switches are caused to be nonconductive, the current is forced to flow through the resistances, which thus reduce the line current. It is another object to employ nonlinear resistances in parallel to the consecutively opening electronic switches so that a maximum amount of circuit energy can be absorbed per electronic switch to limit the number of in-line transfer switches and limit the number of electronic switches in parallel thereto. It is a further object to provide a circuit which employs electronic switches which can be caused to be nonconductive or caused to interrupt current flowing therethrough, so that the connection of these electronic switches in parallel to mechanical transfer contacts causes minimization of the arcing at the transfer switch contacts.

Other objects and advantages of this invention will become apparent from a study of the following portion of the specification, the claims and the attached drawings. Adding a brief description of the drawings:

DESCRIPTION

Figure 1:
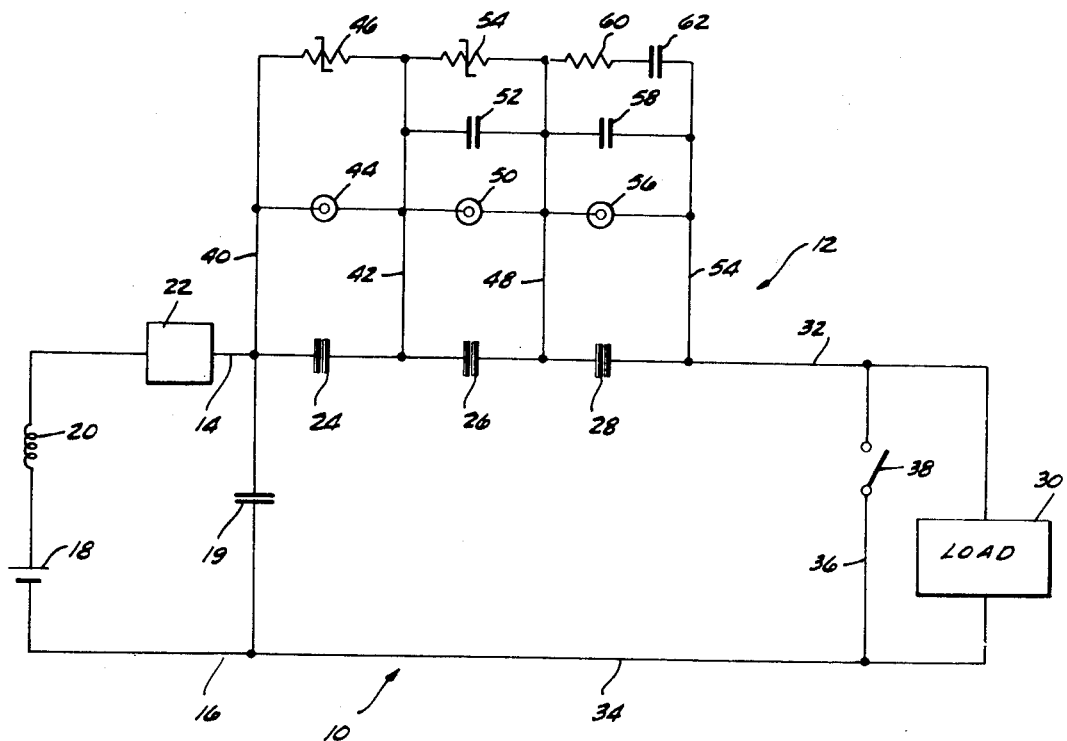
FIG. 1 is a schematic drawing of a high-voltage, high-current DC circuit having the series sequential circuit breaker of this invention connected therein.

FIG. 1 illustrates a high-voltage DC circuit with the series-sequential circuit breaker of this invention incorporated therein. The circuit is generally indicated at 10 and the circuit breaker is generally indicated at 12.

The circuit 10 comprises positive bus 14 and return bus 16. Connected therebetween is a high-voltage, high-current DC power source 18 which is conveniently illustrated as being a battery. However, as is well known to those in the art, the power source usually comprises an engine or turbine driven multiphase AC generator which supplies power to transformers. The transformers increase the voltage and supply the rectifiers which are connected between positive bus 14 and return bus 16. The preferred example given in this specification is for a 400-megawatt system, because that power level appears to be appropriate for future use in power generation adjacent urban environments. Throughout this specification this example is used to illustrate and describe the invention. The invention is not limited by the example. Additionally, the values given as exemplary are applicable only to the example. When the invention is used in different circuits, the values will depend on circuit conditions. The example employed as illustrative of the use of the invention is at a level which might be used in underground transmission of power from nearby generating plants to urban areas. In such an example, the normal current is 1,000 amperes, as illustrated by the ordinate in FIG. 2 where each of the numerals indicates 1,000 a. Furthermore, the normal voltage level between the positive bus 14 and return bus 16 is 200 kilovolts, as illustrated by the ordinate in FIG. 3 where the numbers illustrate 1,000 volts. Furthermore, return bus 16 is preferably at ground potential and a duplicate circuit 10 is provided with a negative bus at −200 kv. and a duplicate of the circuit breaker 12. In other words, FIG. 1 illustrates half of an exemplary 400-MW system.

Inductance 20 is serially connected with power source 18. Inductance 20 represents the inductance of the entire circuit. The circuit inductance limits the change in current with respect to time, and should the normal circuit inductance be too low, and additional inductor can be installed for smoothing and for limiting the rate of current increase in fault conditions. In the specific example of this specification, the circuit inductance is one-half henry so that at the 200 kv. power source voltage, the rate of change of current with respect to time upon occurrence of a fault is 400 a. per millisecond. Capacitor 19 illustrates system capacitance.

Serially connected in the line is fault sensor 22, transfer switch contacts 24, 16 and 28 and load 30. Load 30 can be any conventional commercial load or any special load which employs the power produced by the power source. Thus, load 30 can include inverters, transformers and distribution equipment to the ultimate load. Lines 32 and 34 represent transmission portions of the positive bus 14 and return bus 16, respectively, which transmit the power from the source to the load. Thus, the circuit breaker 12 is preferably adjacent the source 18 and transmission over a distance occurs in lines 32 and 34.

Connection 36, with its switch 38, between lines 32 and 34, represents a short circuit such as might occur at the input to load 30 or in the lines 32 and 34 leading thereto. Closure of the switch 38 represents an inadvertent short circuit and thus, connection 36 with its switch is schematically illustrative of other types of highly conductive electrical connections between lines 32 and 34.

Lines 40 and 42 are connected to bus 14 on opposite sides of transfer switch contacts 24. Electronic switch 44 is connected therebetween to be in parallel with the contacts 24. Additionally, energy-absorbing resistor 46 is connected between lines 40 and 42 to be in parallel to the electronic switch 44.

Similarly, lines 42 and 48 are connected to bus 14 on opposite sides of transfer switch contact 26. Connected between lines 42 and 48, in parallel to contacts 26 are electronic switch 50, surge capacitor 52 and energy-absorbing resistor 54.

Lines 48 and 54 are connected to bus 14 on opposite sides of transfer switch contacts 28. Connected between lines 48 and 54 are electronic switch 56, surge capacitor 58 and the series combination of surge energy resistor 60 and surge capacitor 62.

Figure 4:
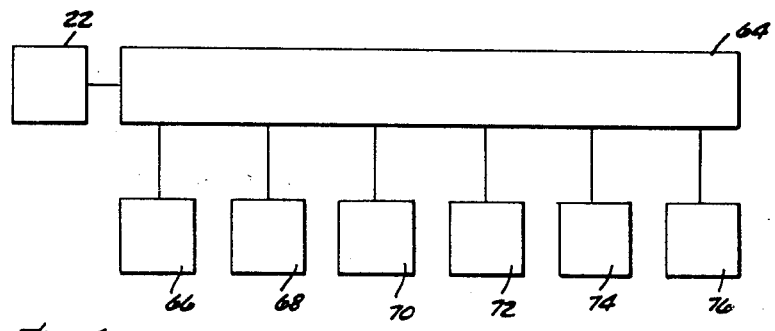
FIG. 4 is a diagrammatic showing of the control equipment which controls the in-line switches and electronic switches of the circuit breaker of this invention

Referring to FIG. 4, fault sensor 22 is connected to control unit 64 which contains control circuitry to function as is hereinafter described. The output of control unit 64 goes to transfer switch operators 66, 70 and 74 and to electronic switch operators 68, 72 and 76.

Transfer switch operators 66, 70 and 74 are respectively connected to operate transfer switch contacts 24, 26 and 28. Similarly, electronic switch operators 68, 72 and 76 are respectively connected to operate electronic switches 44, 50 and 56.

Fault sensor 22 is any convenient and conventional fault sensor which is responsive to voltage between buses 14 and 16, is responsive to current in bus 14 or is responsive to the change in current with respect to time in bus 14, or a combination of these signals. Suitable fault sensors are shown in the following U.S. Pat. Nos. 3,353,171; 3,419,791; 3,463,998; 3,471,784; 3,473,106; 3,475,653; 3,478,352; and 3,489,920. Any one or more of these can be employed as fault sensor 22. Additionally or alternatively, manual-actuating means could be employed to actuate the breaker 12 by actuating control unit 64. In some cases it may be desirable to operate breaker 12 through only a part of the opening sequence. The control unit 64 can be arranged for such control. The particular fault sensor is not critical to the invention and any conventional fault-sensing means can be employed.

Transfer switch contact operator 66 and its contacts 24 are in the nature of those found in a conventional circuit breaker such as shown in Waghorne, et al. U.S. Pat. No. 3,268,687. The requirements are that the transfer switch contacts 24 be able to carry 1,000 a. when closed (the maximum normal current in the exemplified DC circuit of this specification), and to withstand the fault current without damage. Also when open they must withstand without conduction the surge voltage of the circuit. For the purpose of the example, the surge voltage is selected to be 1.7 times the normal circuit voltage. With the normal circuit voltage at 200 kv., the surge voltage is 340 kv. in accordance with this example. Thus, when opened and deionized, the transfer switch contacts 24 must be able to withstand an applied DC voltage of 340 kv. Transfer switch contact operator 70 and 74 and their respective contacts 26 and 28 are respectively identical to operator 66 with its contacts 24.

The electronic switch 44 can be either a crossed field switching device, a liquid metal cathode-switching device, both of which are described in detail in Pat. application Ser. No. 681,632, filed Nov. 9, 1967, now U.S. Pat. No. 3,534,226. Other types of electronic switches which can open with adequate recovery rate and which can operate under the specified conditions can be employed. The requirement of the electronic switch 44 is that it be able to turn on as voltage is applied thereacross. As transfer switch 24 opens, an arc is created thereacross, and as the arc lengthens, voltage rises across the contacts. When this voltage reaches the conduction voltage of electronic switch 44, the electronic switch conducts. As the contacts of transfer switch 24 further open, the arc extinguishes.

With respect to conduction, it must be able to conduct up to four times the normal circuit current. In accordance with the example of the specification, the maximum current has been chosen to be limited to four times normal current, which is consistent with surge voltages of 1.7 times normal voltage, and a one-half-henry-system inductance. Thus, electronic switch 44 must be capable of conducting up to 4,000 a.

Furthermore, the electronic switch 44 must be capable of offswitching against this current. In order to be satisfactory for operation in the circuit of this example, the increase in voltage withstood by switch 44 with respect to time should be about 1 kv. per. microsecond. The crossed field switch and the liquid metal cathode switch of the above-identified patent are satisfactory for this purpose. Of course, the electronic switch 44 may represent one or more serially connected electronic switches as described in the patent, to provide the desired standoff voltage for off-switching capability should the characteristics of electronic switch devices of commercial configuration so indicate. The electronic switches 50 and 56 are identical to the electronic switch 44. As is described in the above identified patent, these electronic-switching devices can be controlled for on and off switching.

Resistors 46 and 54 are shown as being nonlinear resistors. Such are preferable, for with nonlinear resistors the circuit breaker 12 of this invention is able to accomplish the circuit-breaking function of the example with only the two resistors 46 and 54 with then parallel electronic switches 44 and 50. If linear resistors were employed instead of a nonlinear resistors 46 and 54, at least one additional electronic switch would be required. Resistors 46 and 54 are silicon carbide devices. In this example, resistor 46 has such a value that it produces a voltage drop of 340 kv. at 4,000 a. and resistor 54 produces a voltage drop of 130 kv. at 2,500 a.

Surge capacitor 62 is of conventional oil-filled character and has a value of 2 microfarads in the example of the specification. It is capable of withstanding the 340 kv. voltage to arrest the final voltage surge. Its surge suppression resistor 60 has a value of 100 ohms and is capable of carrying 1,000 a. in surge suppression duty.

In normal operation of circuit 10, power source 18 is supplying 1,000 a. of current through inductance 20, fault sensor 22, closed contacts 24, 26 and 28 and through load 30. The voltage drop across the load is the nominal circuit value of 200 kv.

Under these circumstances the electronic switches 44, 50 and 56 are nonconductive, but are in standby condition so that they will become conductive when appropriate voltage is applied thereacross.

Figure 2:
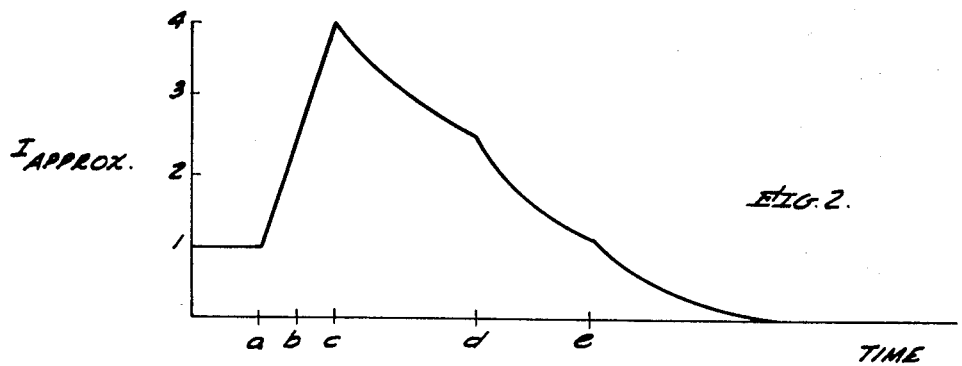
FIG. 2 is a graph of circuit current vs time during the opening sequence of the circuit breaker of this invention.
Figure 3:
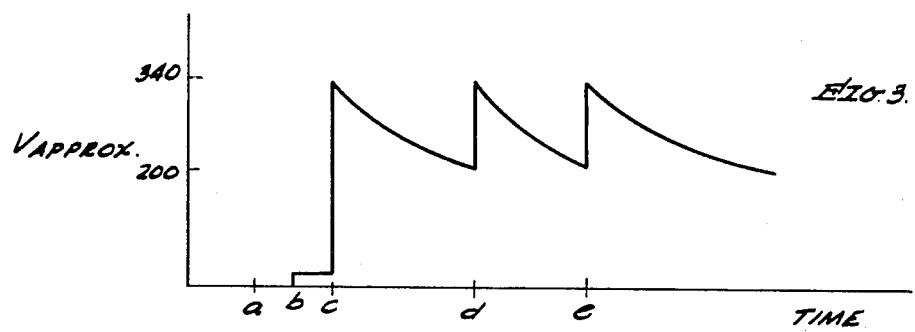
FIG. 3 is a graph showing the voltage across the circuit breaker during the sequence shown in FIG. 2.

At point $a$ in time, a fault appears short-circuiting lines 32 and 34, as represented by the closing of switch 38. This fault causes a drop in voltage across the load to near zero, and an increase in current as limited by the value of inductance 20. Current increases at the rate of 400 a. per msec., as previously described, sensor 22 senses the increase in current, the rate of increase of current, or the decrease in voltage between buses, or the combination of these signals to determine that a fault has occurred. Such determination occurs at point $b$ along the abscissa of the graphs of FIGS. 2 and 3. As indicated, FIG. 2 represents the current through sensor 22, which is equal to the current through power source 18. FIG. 3 represents the voltage across breaker 12. It represents the voltage drop which is produced by the opening of the breaker. In the graphs, from the intersection to point $a$, current is normal and voltage drop across the breaker is zero. At point $a$ the short circuit occurs. In the time interval from $a$ to $b$, the sensor makes the decision as to whether or not it should actuate, and operator 66 opens contacts 24 at point $b$. The voltage drop produced by the initial arcing causes conduction of electronic switch 44 which had been on standby condition awaiting such a voltage applied thereacross, so that through the interval from b to c, the voltage drop across the breaker comprises the voltage drop in electronic switch 44 when it is conducting (slightly reduced by the parallel circuit through resistor 46). From the time interval from b to c, contacts 24 are opened and deionized.

When deionization is complete, at point c operator 68 of electronic switch 44 causes off-switching of the electronic switch. This places the resistance 46 in the line. The value of the resistance is chosen so that at this peak current the placement of that resistance in the line does not cause a surge greater than tolerable, in this case to 340 kv. Should the system capacitance 19 be inadequate to aid in limiting this peak voltage, an additional capacitance can be provided in parallel with resistor 46. This resistance causes reduction in current, with consequent reduction in voltage drop across the breaker.

When this voltage drop across the breaker reduces to near 200 kv., the normal line voltage, operator 70 opens transfer switch contacts 26. This opening causes a voltage drop across electronic switch 50 so that it becomes conductive. When contacts 26 are fully opened and deionized, operator 72 turns off electronic switch 50 at point d. This again causes an increase in voltage drop across the breaker by inserting energy-absorbing resistor 54 in series with resistor 46. The rate of voltage rise is limited by capacitor 52 in addition to the already inserted system capacity. Values are chosen so that the voltage increase by off-switching of electronic switch 50 does not exceed the allowable 340 kv. chosen for this example.

This series combination of resistors causes a further reduction in current through the time period from d to e, together with a reduction in voltage drop across the breaker from near the maximum allowable value toward the nominal line voltage, as indicated in FIG. 3.

In the final step, controller 64 causes the opening of transfer switch contacts 28 which causes voltage drop across the electronic switch 56 which was in standby condition. With this voltage drop, the electronic switch becomes conductive. Transfer switch contacts 28 are fully opened and deionized. At this point, controller 76 causes off switching of electronic switch 56 at point e. The final surge current is absorbed in capacitor 62 with its energy-absorbing resistor 60. When the surge has subsided in the capacitor, the current through the sensor is reduced to zero and the voltage drop across the breaker 12 is at line voltage. The circuit breaker 12 can be employed as a main switch for opening the bus, either at the source and/or load end thereof. Furthermore, it can be employed as a switch for a branch line on a transmission line. Thus, the circuit breaker 12 is a special purpose application of a generic switch.

This invention having been described in its preferred embodiment, it is clear that it is susceptible to numerous modifications and embodiments within the ability of those skilled in the art and without the exercise of the inventive faculty.

What is claimed is:

1. A DC circuit breaker comprising:
    a DC electric line, first and last transfer switch contacts serially connected in said DC electric line to open said DC electric line;
    first and last serially connected electronic switches each connected in parallel to said transfer switch contacts;
    a first energy-absorbing resistor connected in parallel around said first electronic switch;
    a current surge absorbing capacitor connected in parallel around said last electronic switch; and
    control means connected to said transfer switch contacts and to said electronic switches for opening said first transfer switch contacts while said last transfer switch contacts are closed to cause current flow through said first electronic switch, and for subsequently causing said first electronic switches to become nonconductive to cause current flow through said first energy-absorbing resistor, and for subsequently opening said last transfer switch contacts to cause current flow through said last electronic switch and then causing said last electronic switch to become nonconductive to cause current flow into said surge-absorbing capacitor to interrupt current flow in said DC line.

2. The breaker of claim 1 wherein there are first, second and last serially connected transfer switch contacts; first, second and last serially connected electronic switches each connected in parallel to its respective transfer switch and first and second energy-absorbing resistors respectively connected in parallel with said first and second electronic switches.

3. The breaker of claim 2 wherein said first and second energy-absorbing resistors are nonlinear resistors.

4. The breaker of claim 3 wherein an energy-absorbing resistor is connected in series with said surge-absorbing capacitor to absorb system energy upon said third electronic switch becoming nonconductive.

5. The breaker of claim 4 wherein fault-sensing means is connected to said DC line to detect a fault therein, said fault-sensing means being connected to said control means so that upon sensing a fault in said DC line, said control means causes said interrupter to interrupt current in said DC line.

6. The breaker of claim 4 wherein said electronic switch is a crossed field switch.

7. The breaker of claim 4 wherein said electronic switch is a liquid metal cathode switch tube.

8. The breaker of claim 1 wherein fault-sensing means is connected to said DC line to detect the fault therein, said fault-sensing means being connected to said control means so that upon sensing the fault in said DC line, said control means causes said interrupter to interrupt current in said DC line.

9. The breaker of claim 8 wherein said electronic switch is a crossed field switch.

10. The breaker of claim 8 wherein said electronic switch is a liquid metal cathode switch tube.